United States Patent
Taghaboni

(10) Patent No.: US 12,384,616 B1
(45) Date of Patent: Aug. 12, 2025

(54) DIGITAL POWER TAKE-OFF

(71) Applicant: Permco, Inc., Streetsboro, OH (US)

(72) Inventor: Farid Taghaboni, Streetsboro, OH (US)

(73) Assignee: Permco, Inc., Streetsboro, OH (US)

( * ) Notice: Subject to any disclaimer, the term of this patent is extended or adjusted under 35 U.S.C. 154(b) by 0 days.

(21) Appl. No.: 19/013,068

(22) Filed: Jan. 8, 2025

(51) Int. Cl.
*B65F 3/02* (2006.01)
*B60L 1/00* (2006.01)

(52) U.S. Cl.
CPC .............. *B65F 3/02* (2013.01); *B60L 1/003* (2013.01); *B65F 2003/0279* (2013.01)

(58) Field of Classification Search
CPC ........ F16H 61/686; F16H 59/40; F16H 59/42; F16H 59/46; F16H 2059/405; B65F 3/02; B65F 2003/0279
See application file for complete search history.

(56) References Cited

U.S. PATENT DOCUMENTS

| | | | |
|---|---|---|---|
| 3,630,495 A * | 12/1971 | Carroll | B01F 35/212 137/92 |
| 6,994,651 B2 | 2/2006 | Fox et al. | |
| 7,211,018 B2 * | 5/2007 | Kimura | F16H 3/725 475/153 |
| 9,145,905 B2 | 9/2015 | Hou | |
| 11,667,469 B2 | 6/2023 | Betz, II et al. | |
| 11,851,273 B2 | 12/2023 | Koga et al. | |
| 2009/0010094 A1 * | 1/2009 | Uemura | B29B 7/183 366/100 |

* cited by examiner

*Primary Examiner* — Huan Le
(74) *Attorney, Agent, or Firm* — Renner, Otto, Boisselle & Sklar, LLP

(57) ABSTRACT

A digital power take-off system includes an input shaft and an output shaft connected to a planetary gear. An actuator is mechanically coupled to the planetary gear to mechanically control a rotational speed of the output shaft. An output shaft sensor detects the output shaft rotational speed. Controller circuitry receives a desired output shaft rotational speed, receives the output shaft rotational speed from the output shaft sensor, and determines a difference between the rotational speeds. The controller circuitry outputs an operating parameter, based on the determined difference, to the actuator such that the actuator modifies a gear ratio of the planetary gear to maintain the desired output shaft rotational speed over a range of input shaft rotational speeds.

20 Claims, 9 Drawing Sheets

DIGITAL POWER TAKE-OFF

TECHNICAL FIELD

The present disclosure relates to power take-off devices for utility vehicles, and more particularly, digital power take-off devices configured to maintain a desired rpm value of an output shaft of the power take-off device when an input shaft RPM value of the power take-off is variable.

SUMMARY

Service vehicles (e.g., refuse vehicles) include one or more power generation units such as an engine (e.g., an internal combustion engine). The engine supplies rotational power to at least one wheel of the service vehicle to drive or move the service vehicle. The engine can also be used to supply power to vehicle subsystems, such as a dumpster lift system or a refuse compactor.

Service vehicles can use power take-off devices to direct power developed by the engine to one or more vehicle subsystems. The power take-off device helps reduce the need for service vehicles to support and operate a second power generation unit for the vehicle subsystems. In some particular examples, the power generation unit is an internal combustion engine providing a rotational power output.

The rotational power output is often used as an input to a vehicle transmission to provide rotational power to a service vehicle drive train component over a range of rotational speeds and torque values. For example, the service vehicle may have several numbered forward driving "gears" and a reverse "gear." Traditionally, the lower numbered forward driving gears are characterized by relatively low drive train rotational speeds and relatively high torque values. The higher numbered forward gears are characterized by relatively high drive train rotational speeds and relatively low torque values.

Variability in the drive train rotational speed and torque value complicates directing drive train power, through the power take-off device, to the service vehicle subsystems. For example, typical use of a refuse vehicle can include directing drive train power through a power take-off device to a dumpster lift system or a refuse compactor. The dumpster lift system or the refuse compactor may, in turn, transfer the rotational power from the power take-off device output shaft to a hydraulic pump input shaft to operate a hydraulic power system. However, the hydraulic pump may have a preferred input shaft rotational speed or a preferred range of input shaft rotational speeds for proper operation of the vehicle subsystem. The drive train component(s) of the service vehicle, though, typically provide a relatively wide range of shaft rotational speeds depending upon several factors including, but not limited to, the forward or reverse "driving gear" in which the transmission is positioned and the amount of acceleration applied to the engine at a particular time.

A difference between the drive train component rotational speed and the preferred input shaft rotational speed of the vehicle subsystem can be particularly pronounced when the service vehicle is parked or the service vehicle transmission is in a "neutral" position. Often, the service vehicle is parked or the transmission is located in a neutral position when service vehicle subsystems are called into service. In many cases, when the service vehicle is idling at relatively low RPM, the engine does not provide enough rotational speed to the PTO-driven hydraulic pump to operate efficiently or operate a vehicle subsystem.

Service vehicle processes of dumpster lifting, refuse compacting, service bucket maneuvering, aerial ladder and outrigger operating, etc. often include power provision tasks which could be made more efficient with a power take-off device providing relatively uniform output shaft rotational speed when provided a relatively wide range of input shaft rotational speeds. Additionally, a digital power take-off device can provide a power-on-demand feature to reduce power consumption during times when service vehicle subsystems are not in operation.

According to an aspect of the present disclosure, a digital power take-off system includes an input shaft configured to receive mechanical power as an input shaft rotational speed. The power take-off system also includes an output shaft configured to transmit mechanical power as an output shaft rotational speed. The power take-off system further includes a planetary gear including a sun gear located along a central axis. The planetary gear also includes a ring gear located around the sun gear and sharing the central axis with the sun gear. The ring gear is removably connected to the input shaft. The planetary gear further includes at least one planet gear located between and engaged with the sun gear and the ring gear for rotation about an offset axis and revolution about the central axis. The planetary gear still further includes a carrier coupled to the at least one planet gear such that revolution of the at least one planet gear urges rotation of the carrier. The carrier is removably connected to the output shaft. The power take-off system still further includes an actuator mechanically coupled to the sun gear. The actuator is configured to mechanically control a rotational speed of the sun gear based on a received operating parameter. The power take-off system includes an output shaft sensor configured to detect the output shaft rotational speed. The power take-off system also includes a controller circuitry in electrical communication with the output shaft sensor and the actuator. The controller circuitry is configured to receive a desired output shaft rotational speed, receive the output shaft rotational speed from the output shaft sensor, determine a difference between the output shaft rotational speed and the desired output shaft rotational speed, determine the operating parameter based on the determined difference, and output the operating parameter to the actuator, such that the actuator modifies a gear ratio of the planetary gear by modifying the rotational speed of the sun gear to maintain the desired output shaft rotational speed over a range of input shaft rotational speeds.

According to another aspect of the present disclosure, a method includes providing power to one or more components of a subsystem of a service vehicle. The service vehicle includes a chassis supporting a wheel and an engine configured to provide mechanical power to drive the wheel. The service vehicle also includes a digital power take-off system includes an input shaft configured to receive mechanical power as an input shaft rotational speed. The power take-off system also includes an output shaft configured to transmit mechanical power as an output shaft rotational speed. The power take-off system further includes a planetary gear including a sun gear located along a central axis. The planetary gear also includes a ring gear located around the sun gear and sharing the central axis with the sun gear. The ring gear is removably connected to the input shaft. The planetary gear further includes at least one planet gear located between and engaged with the sun gear and the ring gear for rotation about an offset axis and revolution about the central axis. The planetary gear still further includes a carrier coupled to the at least one planet gear such that revolution of the at least one planet gear urges rotation of the carrier. The carrier is removably connected to the output shaft. The power take-off system still further includes an actuator mechanically coupled to the sun gear. The actuator is configured to mechanically control a rotational speed of the sun gear based on a received operating parameter. The power take-off system includes an output shaft sensor configured to detect the output shaft rotational speed. The power take-off system also includes a controller circuitry in electrical communication with the output shaft sensor and the actuator. The controller circuitry is configured to receive a desired output shaft rotational speed, receive the output shaft rotational speed from the output shaft sensor, determine a difference between the output shaft rotational speed and the desired output shaft rotational speed, determine the operating parameter based on the determined difference, and output the operating parameter to the actuator, such that the actuator modifies a gear ratio of the planetary gear by modifying the rotational speed of the sun gear to maintain the desired output shaft rotational speed over a range of input shaft rotational speeds.

According to another aspect of the present disclosure, a service vehicle includes a chassis supporting a wheel and an engine configured to provide mechanical power to drive the wheel. The service vehicle also includes a digital power take-off system includes an input shaft configured to receive mechanical power as an input shaft rotational speed. The power take-off system also includes an output shaft configured to transmit mechanical power as an output shaft rotational speed. The power take-off system further includes a planetary gear including a sun gear located along a central axis. The planetary gear also includes a ring gear located around the sun gear and sharing the central axis with the sun gear. The ring gear is removably connected to the input shaft. The planetary gear further includes at least one planet gear located between and engaged with the sun gear and the ring gear for rotation about an offset axis and revolution about the central axis. The planetary gear still further includes a carrier coupled to the at least one planet gear such that revolution of the at least one planet gear urges rotation of the carrier. The carrier is removably connected to the output shaft. The power take-off system still further includes an actuator mechanically coupled to the sun gear. The actuator is configured to mechanically control a rotational speed of the sun gear based on a received operating parameter. The power take-off system includes an output shaft sensor configured to detect the output shaft rotational speed. The power take-off system also includes a controller circuitry in electrical communication with the output shaft sensor and the actuator. The controller circuitry is configured to receive a desired output shaft rotational speed, receive the output shaft rotational speed from the output shaft sensor, determine a difference between the output shaft rotational speed and the desired output shaft rotational speed, determine the operating parameter based on the determined difference, and output the operating parameter to the actuator, such that the actuator modifies a gear ratio of the planetary gear by modifying the rotational speed of the sun gear to maintain the desired output shaft rotational speed over a range of input shaft rotational speeds.

The following description and the annexed drawings set forth certain illustrative embodiments of the disclosure. These embodiments are indicative, however, of but a few of the various ways in which the principles of the disclosure may be employed. Other objects, advantages and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the tool and its use.

DETAILED DESCRIPTION

Figure 1:
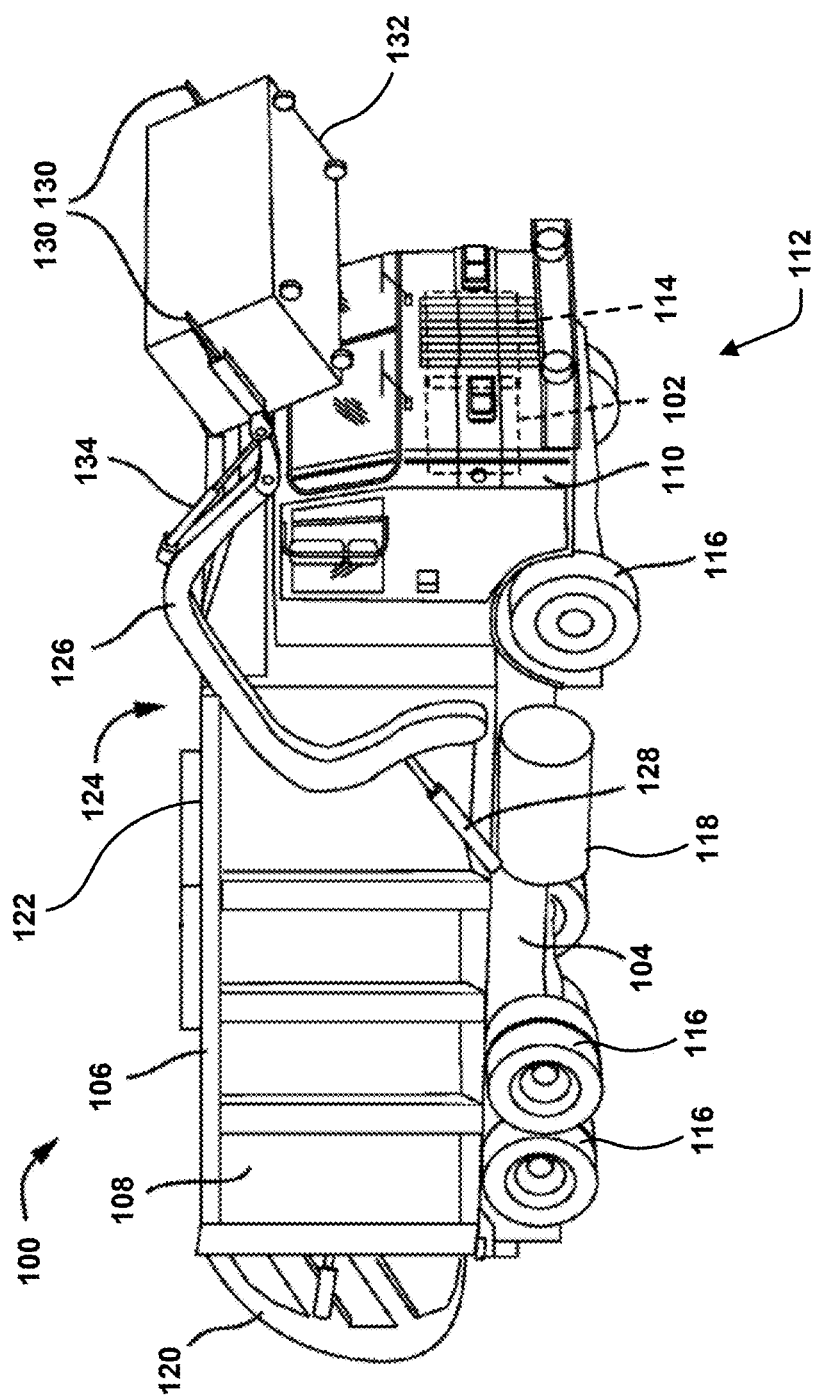
FIG. 1 is a perspective view of an exemplary service vehicle including a digital power take-off device.

While the described apparatus and methods can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended.

The present disclosure is directed to power take-off devices to provide mechanical power developed in an engine to subsystems of a service vehicle. A disclosed digital power take-off system is configured to mechanically control a rotational speed of a portion of a planetary gear train to modify an output shaft rotational speed of a power take-off device. An actuator receives an operating parameter from a controller circuit based upon a difference between an actual output shaft rotational speed and a desired output shaft rotational speed. The operating parameter informs the actuator to urge motion of a control shaft to modify a gear ratio of the planetary gear train resulting in an actual output shaft rotational speed matching the desired output rotational speed.

Referring initially to FIG. 1, an exemplary service vehicle 100 including a power take-off device 102 is illustrated. In this embodiment, the service vehicle 100 is depicted as a refuse vehicle (e.g., a garbage truck, a waste collection truck, a sanitation truck, etc.). While illustrated as a refuse vehicle and referred to below as a refuse vehicle, the service vehicle 100 may be any suitable service vehicle that utilizes power take-off systems, such as utility trucks, fire trucks, construction vehicles, or other specialized vehicles requiring auxiliary power for subsystems.

The refuse vehicle 100 includes a chassis 104, shown as a truck frame 104, and a body assembly 106 coupled to the truck frame 104. The body assembly 106 defines an on-board receptacle 108 and a cab 110. The cab 110 is coupled to a front end 112 of the truck frame 104 and includes various components to facilitate operation of the refuse vehicle 100 by an operator (e.g., a seat, a steering wheel, hydraulic controls, etc.) as well as components that can execute commands automatically to control various vehicle subsystems within the vehicle (e.g., computers, controllers, processing units, etc.). The refuse vehicle 100 further includes a prime mover 114 coupled to the frame 104 at a position beneath the cab 110 or at any other suitable location.

The prime mover 114 provides power to a plurality of motive members, shown as wheels 116, and to other subsystems of the vehicle (e.g., a pneumatic system, a hydraulic system, etc.). In some examples, the prime mover 114 is an internal combustion engine 114 attached to the frame 104. The engine 114 may consume fuel from at least one on-board fuel tank 118 to provide power to the motive members and various subsystems of the refuse vehicle 100.

In some examples, the refuse vehicle 100 is configured to transport refuse, recyclable materials, etc. from various receptacles within a municipality to a storage or processing facility (e.g., a landfill, an incineration facility, a recycling facility, etc.). As shown in FIG. 1, the body 106, the on-board receptacle 108, and a tailgate 120 can define a collection chamber 122 of the on-board receptacle 108. Collected refuse and recyclable items are placed into the collection chamber 122, where it may be thereafter compacted. The collection chamber 122 provides temporary storage for refuse during transport. For example, refuse can be loaded the collection chamber 122 behind the cab 110 and compacted into a position further toward the rear of the refuse vehicle 100 such as the receptacle 108. In some examples, a hydraulic system mounted to the tailgate 120 compacts refuse within the on-board receptacle 108.

As shown in FIG. 1, the refuse vehicle 100 can be a front-loading refuse vehicle 100 including a lifting system 124 that includes a pair of arms 126 coupled to the frame 104 on either side of the cab 110. The arms 126 may be rotatably coupled to the frame 104 with a pivot (e.g., a lug, a shaft, etc.). In some examples, actuators 128 (e.g., hydraulic cylinders, etc.) are coupled to the frame 104 and the arms 126, and extension of the actuators 128 rotates the arms 126 about an axis extending through the pivot. Additionally, interface members, shown as forks 130, are coupled to the arms 126. The forks 130 are configured to engage a refuse container 132 (e.g., protrude through apertures within the refuse container, etc.). During operation of the refuse vehicle 100, the arms 126 are rotated to lift the refuse container 132 over the cab 110. A second actuator 134 (e.g., a hydraulic cylinder) articulates the forks 130 to tip refuse out of the refuse container 132 and into the collection chamber 122. The actuator 128 thereafter rotates the arms 126 to return the empty refuse container 132 to a ground surface. This front-loading system is described for illustrative purposes of an exemplary service vehicle subsystem only, and any suitable loading arrangements can be used with the devices and methods of the present disclosure. For example, a side-loading service vehicle including a lifting system configured for residential-style refuse containers or a rear-loading service vehicle are also contemplated. Various other types of vehicle subsystems for service vehicles are also contemplated.

The described front-loading system (lifting system 124) and the hydraulic compaction system associated with the tailgate 120 are provided as examples of vehicle subsystems that often collect rotational power developed in the engine 114 to operate the vehicle subsystem. Often, the power take-off device (PTO) 102 collects rotational power developed in the engine 114 and transfers the collected rotational power from the drivetrain of the service vehicle 100 to another application (e.g., the vehicle subsystem). Suitable PTO 102 can include a flywheel PTO attached to the engine 114, a transmission PTO attached to the service vehicle transmission, a full-power PTO attached to a drive train component between the engine 114 and the service vehicle transmission, or any other suitable PTO. Selection criteria of the PTO type can include the amount of rotational power required to operate the various subsystems, whether the service vehicle 100 is stopped or moving during operation of the subsystems, necessary torque capacity of the PTO, the PTO operating speed, etc.

Figure 2:
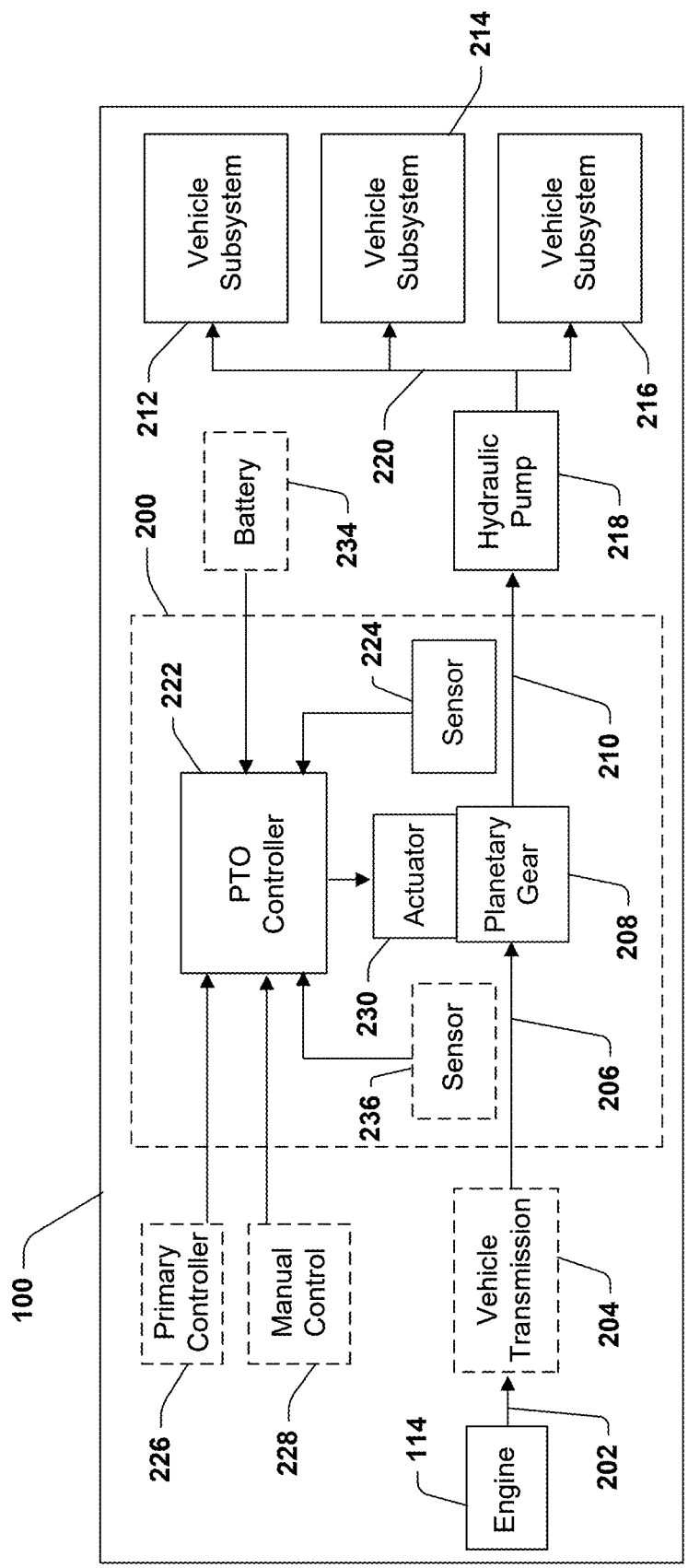
FIG. 2 is a schematic representation of an exemplary digital PTO system mated with the service vehicle of FIG. 1.

Referring to FIG. 2, a schematic representation of an exemplary digital PTO system (DPTO) 200 is illustrated. The DPTO system 200 is configured to receive mechanical power from the engine 114. Arrow 202 represents a transfer of rotational power. In some examples, a rotating output shaft transfers rotational power to a vehicle transmission 204. While many service vehicles 100 include a vehicle transmission 204 to provide several forward drive gearing ratios and a reverse gear for a drive train of the service vehicle 100, there are some examples that may not include a vehicle transmission between the engine 114 and the DPTO system 200. As such, the vehicle transmission 204 is represented in dashed lines. For example, the engine 114 may supply rotational power directly to the DPTO 200 through various structures as represented by arrow 202 combined with arrow 206. Regardless of whether the vehicle transmission 204 is located between the engine 114 and the DPTO 200, arrows 202 and 206 can represent rotating shafts, direct gearing, and other suitable structures that transfer rotational power between service vehicle components.

The DPTO 200 includes an input shaft represented by arrow 206 in FIG. 2. At least one of the engine 114 or the vehicle transmission 204 control the input shaft 206 rotational speed. In turn, the DPTO 200 is configured to receive mechanical power as the rotational speed of the input shaft 206 through shafts, gears, and other power transmission components.

The DPTO 200 also includes a planetary gear 208 or epicyclic geartrain that will be further described below in reference to FIGS. 4-7. The planetary gear 208 can be a portion of a power take-off device. Generally, the planetary gear 208 receives the mechanical power of the input shaft 206 as a rotational speed, modifies the rotational speed through a gear ratio, and transfers the mechanical power to an output shaft as represented by arrow 210 in FIG. 2. For the purposes of this disclosure, the gear ratio of the planetary gear 208 is considered to be the ratio of the rotational speed of the input shaft 206 of the planetary gear 208 to the rotational speed of the output shaft 210. The output shaft 210 is configured to transmit the mechanical power as an output shaft rotational speed to one or more vehicle subsystems 212, 214, 216 that can include a hydraulic pump 218.

As a component of at least one vehicle subsystem 212, 214, 216, the hydraulic pump 218 pressurizes hydraulic fluid onboard the refuse vehicle 100, which can then be supplied to various hydraulic cylinders and actuators of the vehicle subsystems 212, 214, 216 through suitable hydraulic lines and fittings represented by the lines and arrows of flow direction at 220. For example, the hydraulic pump 218 can provide pressurized hydraulic fluid to each of the hydraulic cylinders (actuators 128) of the lifting system 124 on the refuse vehicle 100 which may constitute the vehicle subsystem 212.

Additionally or alternatively, the hydraulic pump 218 can provide pressurized hydraulic fluid to a hydraulic cylinder controlling a compactor of vehicle subsystem 214. In some examples, the hydraulic pump 218 provides pressurized hydraulic fluid to the hydraulic cylinders that control a position and orientation of the tailgate 120 of vehicle subsystem 216. The described vehicle subsystems are merely examples and any number of other suitable vehicle subsystems can be used with the DPTO 200.

Remaining with FIG. 2, the hydraulic pump 218 operates at a rotational speed or a range of rotational speeds to maintain pump performance within the preferred operating range (POR) of the pump curve relative to the best efficiency point (BEP). The POR is a range of flow rates above and below BEP where pump efficiency and pump reliability are optimal for particular flow rates. As such, it can be beneficial to modify the rotational speed of the output shaft 210 (output shaft rotational speed) to a desired output shaft rotational speed to match or more closely match the rotational speed that operates the hydraulic pump 218 within the POR. The desired output shaft rotational speed of the output shaft 210 can then be directly coupled to the hydraulic pump 218 for operation of the vehicle subsystems 212, 214, 216.

The DPTO 200 includes a controller circuit or controller circuitry 800 within a PTO controller 222 configured to control and monitor (e.g., by receiving data from a sensor) the rotational speed of the output shaft 210. The controller circuitry 800 will be discussed in greater detail with reference to FIGS. 8 and 9. The DPTO 200 also includes an output shaft sensor 224, located proximate to or adjacent to the output shaft 210, configured to detect the output shaft rotational speed.

The output shaft sensor 224 can be any suitable sensor for detection of rotational speed of rotating components such as output shaft 210. The controller circuitry 800 of the PTO controller 222 is in electrical communication with the output shaft sensor 224 to receive an electrical signal indicative of the output shaft rotational speed. Simply put, the output shaft sensor 224 detects the rotational speed of the output shaft 210 and transmits a representation of the output shaft rotational speed to the PTO controller 222.

Remaining with FIG. 2, the controller circuitry 800 of the PTO controller 222 is configured to receive a desired output shaft rotational speed. Often, the desired output shaft rotational speed is equal to or is relatively close to the rotational speed of the hydraulic pump 218 that maintains pump performance within the POR. In some examples, the desired output shaft rotational speed is a range of rotational speeds that maintain hydraulic pump 218 performance within the POR. The desired output shaft rotational speed can be received in a number of suitable ways. For example, the desired output shaft rotational speed can be stored on a memory circuit of the PTO controller 222.

In some examples, the DPTO 200 includes an optional primary controller 226 including processor circuitry in electrical communication with the controller circuitry 800 of the PTO controller 222 that serves as a higher-level control unit within the service vehicle's control architecture.

The primary controller 226 may include processor circuitry and is in electrical communication with the controller circuitry 800 of the PTO controller 222. The primary controller 226 can be a programmable logic controller (PLC) or another suitable processing unit capable of executing complex control algorithms, handling multiple input and output signals, and interfacing with various vehicle systems.

The primary controller 226 is configured to send electrical signals to the controller circuitry 800 of the PTO controller 222 to modify the desired output shaft rotational speed based on a variety of operating parameters and conditions. For instance, the primary controller 226 may adjust the desired output shaft rotational speed in response to: the input shaft rotational speed, vehicle operating conditions, subsystem demands, operator inputs, and/or safety and efficiency parameters Regarding input shaft rotational speed, by receiving data from an input shaft sensor 236, the primary controller 226 can monitor the rotational speed of the input shaft 206. It can use this information to anticipate changes in engine load or vehicle speed and proactively adjust the desired output shaft rotational speed to maintain optimal performance of the DPTO 200.

Regarding vehicle operating conditions, the primary controller 226 may take into account the current gear selection of the vehicle transmission 204, vehicle speed, engine load, or other operational data. By processing this information, it can optimize the DPTO system's performance under varying conditions, such as during acceleration, deceleration, or idling.

Regarding subsystem demands, for vehicles with multiple subsystems (e.g., hydraulic pumps, compressors, generators), the primary controller 226 can coordinate the power requirements of each subsystem. It can adjust the desired output shaft rotational speed to ensure that all subsystems receive adequate power without overloading the engine 114.

Regarding operator inputs, the primary controller 226 can process inputs from manual control devices 228 located within the cab 110 or elsewhere on the vehicle. Operators can use these controls to set or adjust the desired output shaft rotational speed based on the specific tasks being performed, such as increasing power for heavy lifting or reducing speed for precision operations.

Regarding safety and efficiency parameters, the primary controller 226 may incorporate safety protocols and efficiency algorithms. For example, it can prevent the DPTO 200 from exceeding predetermined rotational speed limits, reduce fuel consumption by adjusting power output during idle periods, or initiate automatic shutdown sequences in response to fault conditions detected by sensors.

In addition to modifying the desired output shaft rotational speed, the primary controller 226 can facilitate communication between the DPTO 200 and other vehicle systems. It may interface with the vehicle's onboard diagnostic systems, telematics modules, or external devices for data logging, remote monitoring, or software updates.

Figure 3:
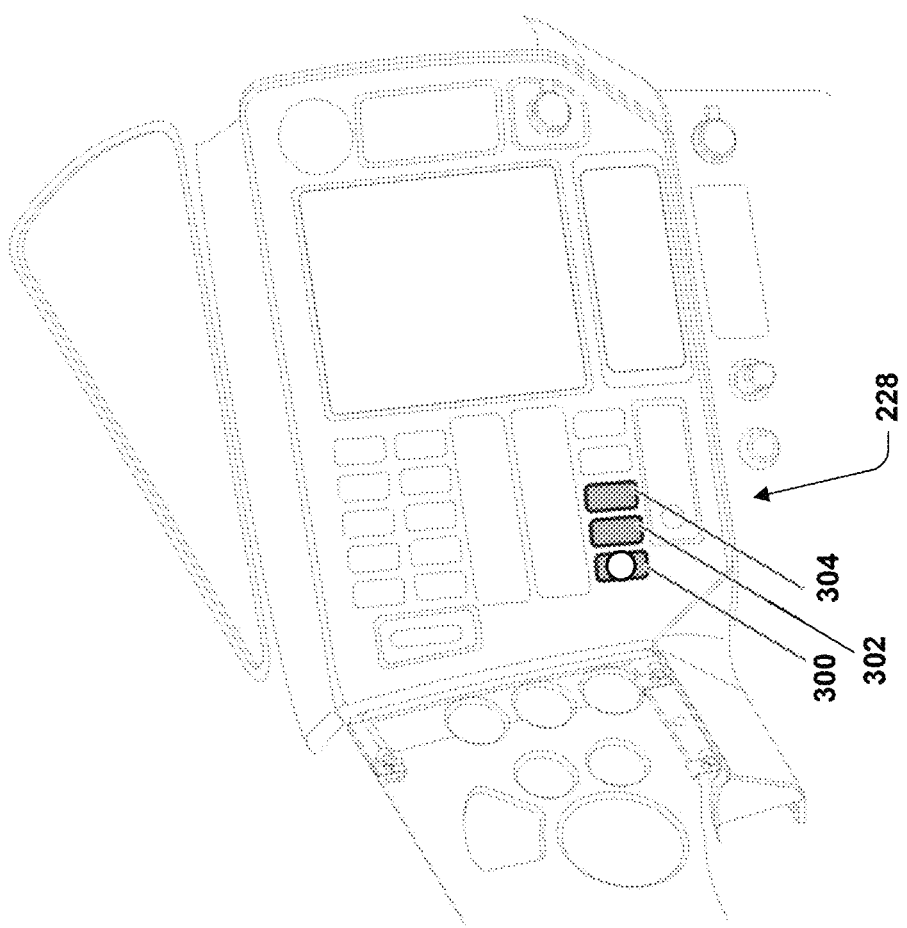
FIG. 3 is a perspective view of an exemplary dashboard environment of the service vehicle of FIG. 1.

In some examples, the PTO controller 222 is configured to receive the desired output shaft rotational speed from a manual control device 228, shown in in electrical communication with the controller circuitry 800 of the PTO controller 222. In some examples, the manual control device 228 is configured to selectively send an electrical signal to the controller circuitry 800 to modify the desired output shaft rotational speed. In some examples, the manual control device 228 can be located in the cab 110 of the service vehicle 100 as shown in FIG. 3. As described, the manual control device may be used by an operator to adjust the desired output shaft rotational speed.

An example dashboard environment of the service vehicle 100 is illustrated in FIG. 3, where the manual control device 228 can be controlled by an operator of the service vehicle 100. From the cab 110, the operator can select a desired output shaft rotational speed with the manual control device 228 such as a potentiometer 300, however, any suitable manual control device can be used. The potentiometer can enable the operator to set the desired output shaft rotational speed to an infinite number of values between a low limit value and a high limit value, for example, between 0 RPM and 2,200 RPM. As such, the manual control device 228 can be used to selectively set the desired output shaft rotational speed to zero, meaning the output shaft 210 does not transfer rotational power to the hydraulic pump 218. In this way, the operator can manually control the DPTO 200 to produce hydraulic power for vehicle subsystems 212, 214, 216 "on demand" rather than continuously.

Additional manual control devices 302, 304 can be included for control of additional performance aspects of the DPTO 200, however these additional manual control devices 302, 304 are also not required. In some examples, the manual control device 228 can also include a control device on an exterior surface of the service vehicle 100 including, but not limited to, a remote potentiometer within line-of-sight of a particular vehicle subsystem 214, an emergency stop button, etc.

Returning to FIG. 2, an actuator 230 is mechanically coupled to a portion of the planetary gear 208 as will be described below in reference to FIGS. 4-7. The actuator 230 is in electrical communication with the controller circuitry 800 of the DPTO 200.

As previously discussed, the controller circuitry 800 of the PTO controller 222 is configured to receive the desired output shaft rotational speed (e.g., a desired output shaft RPM). The controller circuitry 800 of the PTO controller 222 is also configured to receive and the output shaft rotational speed from the output shaft sensor 224 (e.g., an actual output shaft RPM). The controller circuitry 800 of the PTO controller 222 is further configured to determine a difference between the output shaft rotational speed and the desired output shaft rotational speed. In other words, if the actual output shaft RPM is not equivalent to the desired output shaft RPM, the PTO controller 222 will calculate the difference between the two rotational speeds. Based upon the determined difference, the PTO controller 222 will determine an operating parameter. The operating parameter can be an electrical signal such as a voltage value output to the actuator 230.

The controller circuitry of the PTO controller 222 is also configured to output the operating parameter to the actuator 230. Upon receipt of the operating parameter, the actuator 230 urges motion of a component (e.g., rotates a shaft) according to the operating parameter. Motion of the component interacts with the planetary gear 208 such that the actuator 208 modifies the gear ratio of the planetary gear 208. For example, the actuator 208 can modify the gear ratio of the planetary gear 208 by modifying a rotational speed of a sun gear 600 (shown in FIG. 6) of the planetary gear 208.

Figure 4:
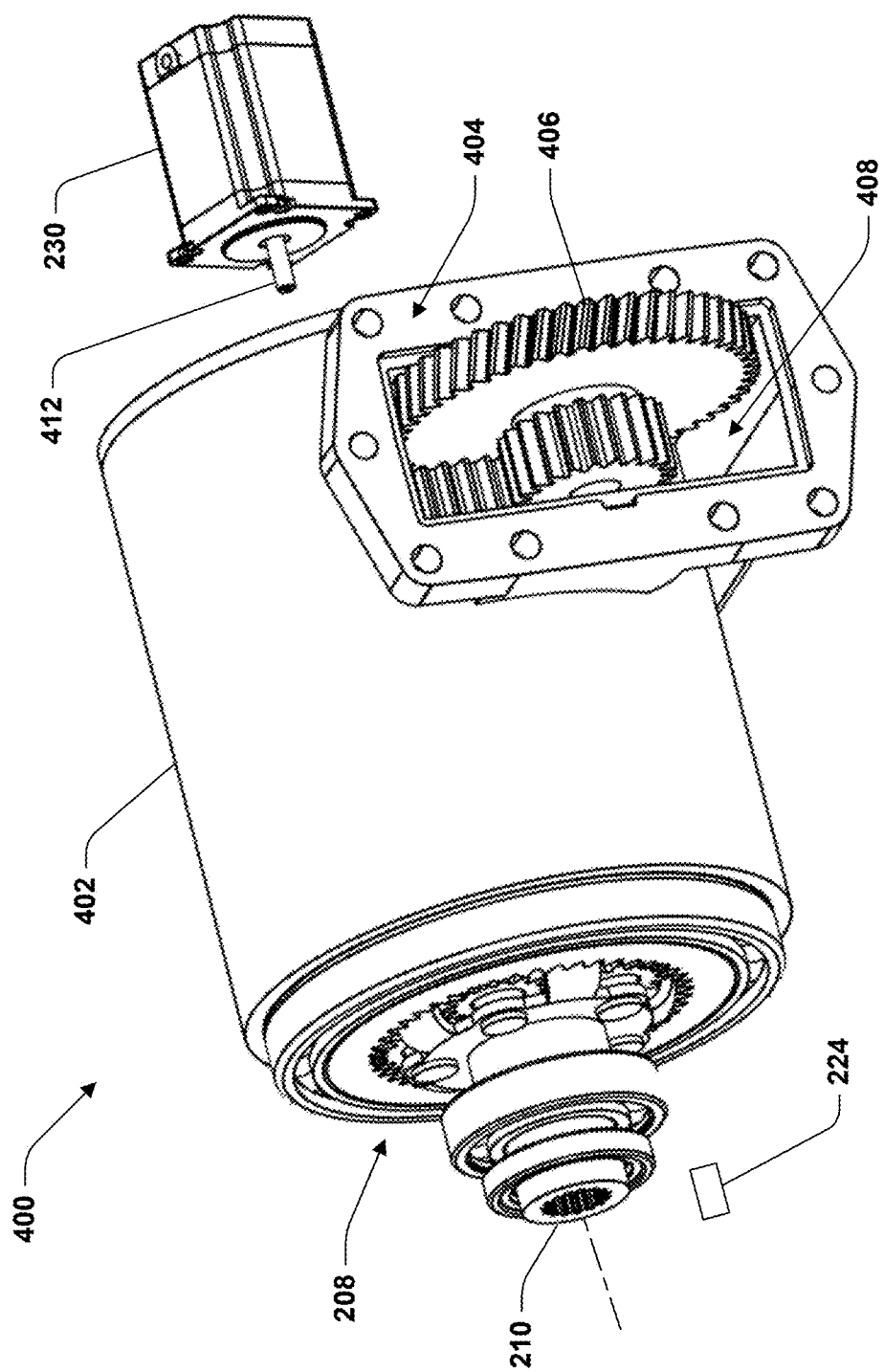
FIG. 4 is a perspective view of an exemplary power take-off device and an actuator of the digital PTO system of FIG. 2.

Referring to FIG. 4, a perspective view of an exemplary power take-off device 400 is illustrated including a planetary gear 208 and other components of the DPTO 200. The power take-off device 400 can include a housing 402 that houses and protects the planetary gear 208 and various other components of the DPTO 200. As previously described, the power take-off device 400 can be mounted at various locations of a drive train of the service vehicle 100. In the example shown, and as described for the remainder of the disclosure, the power take-off device 400 is mounted directly to the vehicle transmission 204 (not shown in FIG. 4) located underneath the service vehicle for relatively easy access, however, any suitable location is satisfactory. The housing 402 can include one or more machined faces 404 to cooperate with a suitable mounting surface on the vehicle transmission 204 and may cooperate with threaded fasteners, gaskets, seals, and similar mounting equipment. In some examples, an input gear 406 can extend through an aperture 408 in the housing 402 to mesh with a cooperating gear in the vehicle transmission 204 to transfer rotational power from the vehicle transmission 204 to the planetary gear 208.

In some examples, rotational power can be transferred from the vehicle transmission 204 to the planetary gear 208 via a rotating shaft, a clutch, or other structures.

FIG. 4 also includes a representation of the actuator 230 which can be a motor such as a stepper motor configured to urge motion of a component such as rotate a motor output shaft 412. As will be described, the motor output shaft 412 can be connected to a sun gear of the planetary gear 208 such that rotation of the shaft 412 urges rotation of the sun gear to modify the gear ratio of the planetary gear 208. Generally speaking, rotational power is input to the power take-off device 400 at the front right portion of FIG. 4. Through a power train, the input gear 406 will transfer rotational power to the planetary gear 208 for application of a gear ratio as defined by the geometry and rotational speeds of the planetary gear components. The planetary gear 208 transfers the rotational power to the output shaft 210 at the left of FIG. 4. The output shaft sensor 224 is also shown proximate the output shaft 210 to determine or measure the output shaft rotational speed.

Figure 5:
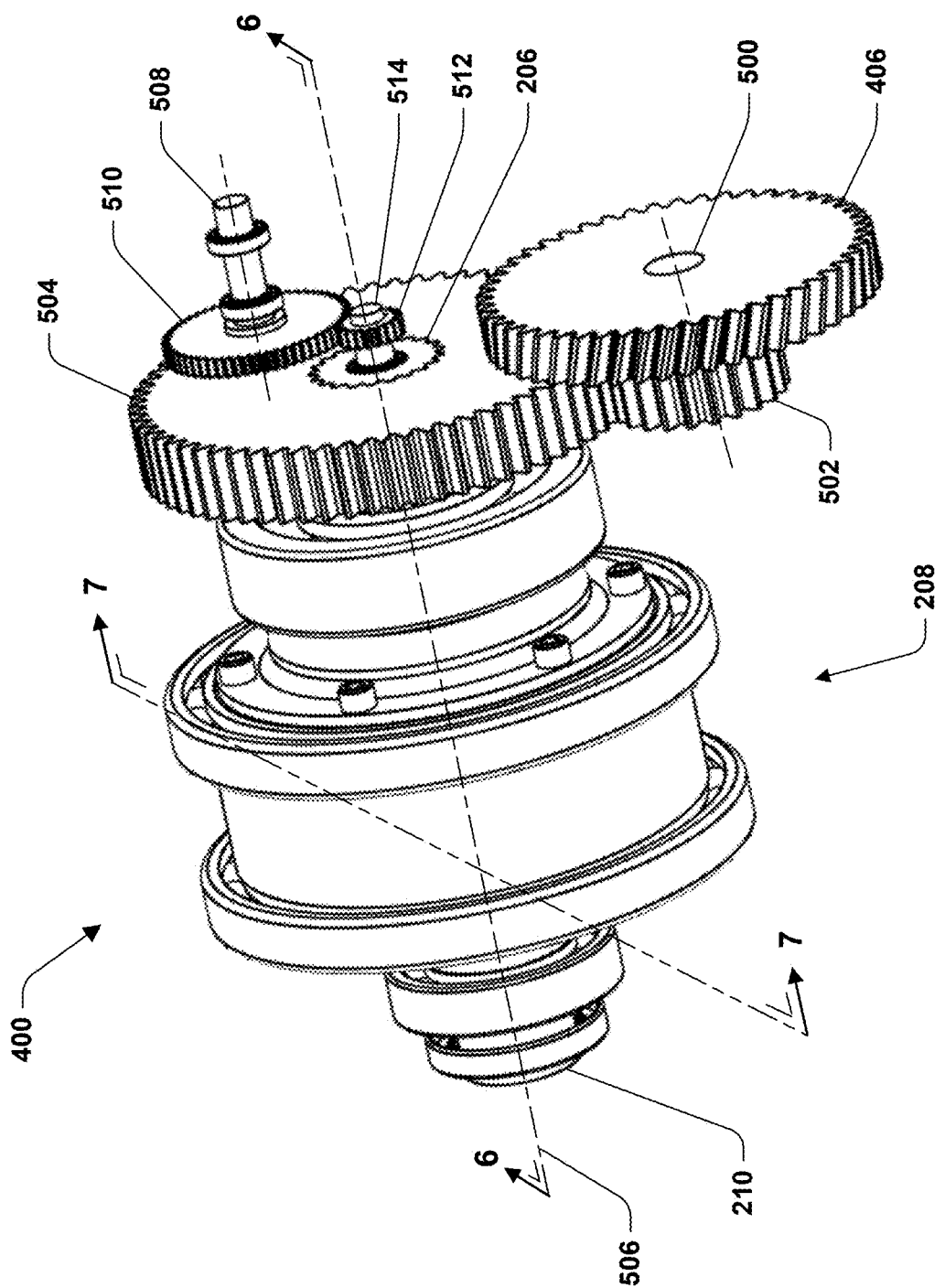
FIG. 5 is similar to FIG. 4 with a housing and an actuator removed from view.

Referring to FIG. 5, a perspective view of the power take-off device 400 is illustrated without the housing 402 for clarity. The input gear 406 is connected through a shaft 500 to an idler gear 502. The idler gear 502 is enmeshed with and transfers rotational power to a driver gear 504 centered about a central axis 506 of the planetary gear 208. The driver gear is attached to the input shaft 206 of the DPTO 200. The input gear 406, the shaft 500, the idler gear 502, and the driver gear 504 are examples of transmission components and are not meant to be limiting.

Any suitable arrangement of transferring rotational power to the input shaft 206 can be used with the present disclosure. Those of skill in the art will understand that the gearing ratio and various design aspects of the input gear 406, the shaft 500, the idler gear 502, and the driver gear 504 can be engineered and manufactured to transfer rotational power to the input shaft 206 at a desired rotational speed and a desired rotational direction.

Additionally, the motor output shaft 412 (shown in FIG. 4) is attached to an intermediate control shaft 508 that is attached to and rotates a first control gear 510. In turn, the first control gear 510 is enmeshed with and rotates a second control gear 512 that is attached to a control shaft 514. The gearing ratio and various design aspects of the first control gear 510 and the second control gear 512 can be engineered and manufactured to transfer rotational power to the control shaft 514 at a desired rotational speed and a desired rotational direction.

Figure 6:
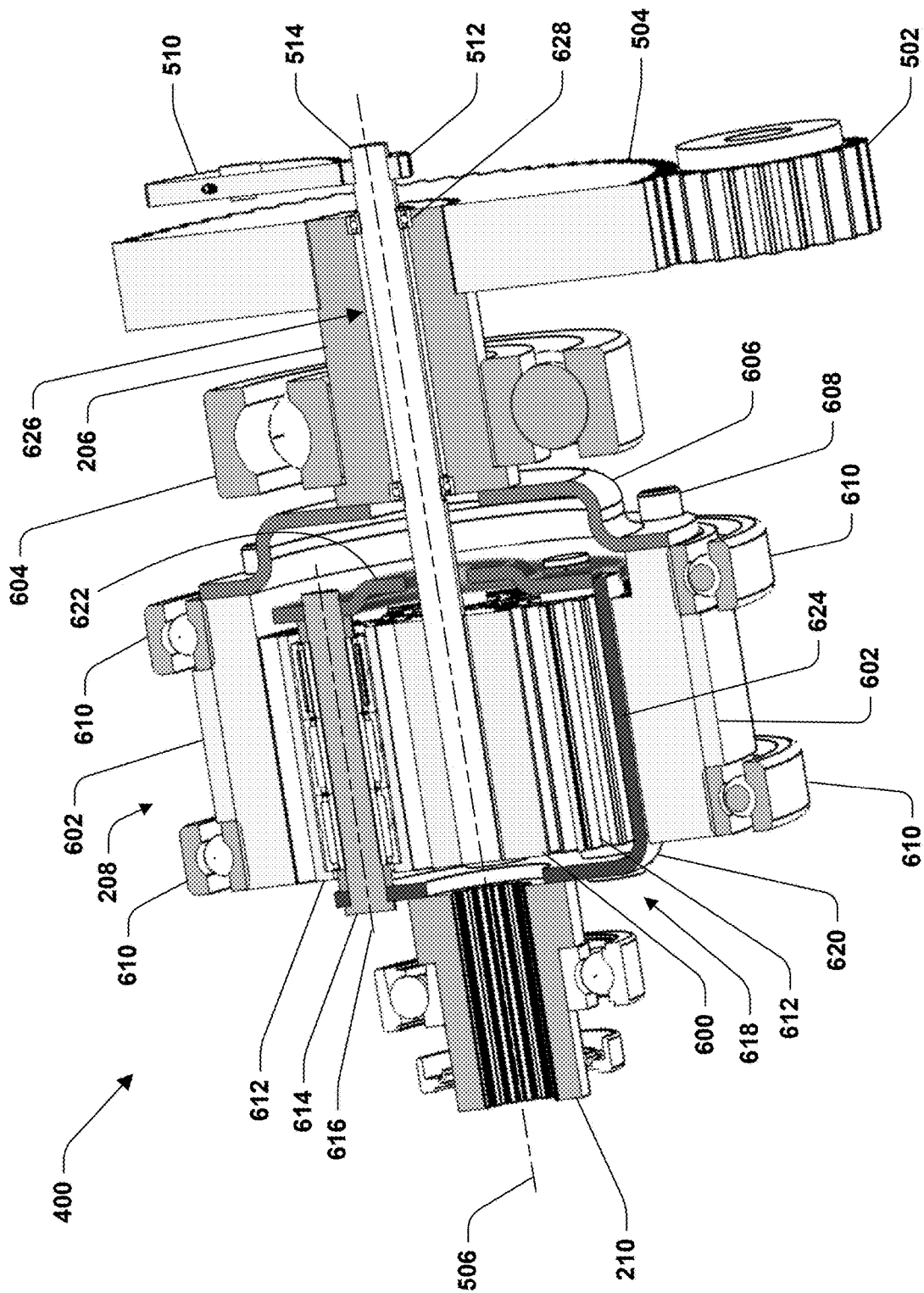
FIG. 6 is a cross-section view of the power take-off device taken along line 6-6 of FIG. 5.
Figure 7:
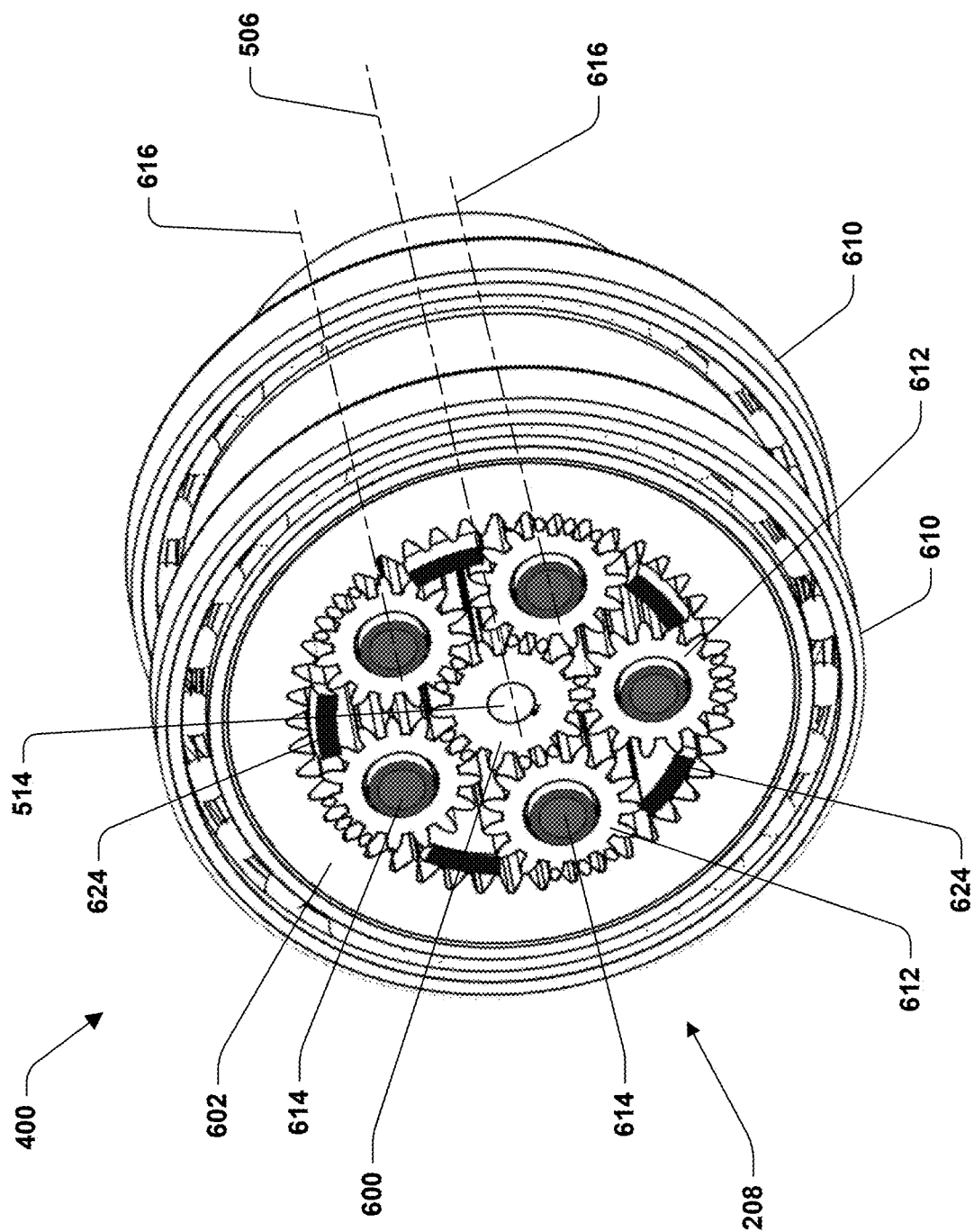
FIG. 7 is a cross-section view of the power take-off device taken along line 7-7 of FIG. 5.

Referring to FIGS. 6 and 7, a cross-section view of the power take-off device 400 taken along line 6-6 of FIG. 5 is illustrated in FIG. 6. A cross-section view of the power take-off device 400 taken along line 7-7 of FIG. 5 is illustrated in FIG. 7. The planetary gear 208 of the power take-off device 400 includes a sun gear 600 located along the central axis 506. In some examples, the sun gear 600 is attached to the control shaft 514 using a key and keyway arrangement, however, any suitable attachment structures and methods such as splined connections, press fits, etc. are satisfactory.

The planetary gear 208 also includes a ring gear 602 located around the sun gear 600 and sharing the central axis 506 with the sun gear 600. The ring gear 602 can be removably connected to the input shaft 206 such that the rotational speed of the input shaft 206 is imparted to the ring gear 602. The input shaft 206 can be rotatably mounted within the housing 402 (not shown in FIG. 6 for simplicity) with a ball bearing 604, a roller bearing, or any suitable structure. In some examples, the ring gear 602 is attached to the input shaft 206 through a ring cap 606 using a threaded fastener 608. The ring cap 606 can define a central aperture enabling the control shaft 514 to pass through the ring cap 606. The ring gear 602 can be rotatably mounted within the housing 402 with a ball bearing 610, a roller bearing, or any suitable structure.

Remaining with FIGS. 6 and 7, the planetary gear 208 further includes at least one planet gear 612 located between and engaged with the sun gear 600 and the ring gear 602. Each planet gear 612 is rotatably mounted to a planet pin 614 centered along an offset axis 616. As a set of teeth of the planet gear 612 are meshed with both the teeth of the sun gear 600 and the teeth of the ring gear 602, the geometric relationship of the planetary gear 208 enables rotation of the planet gear 612 about the offset axis 616 and revolution about the central axis 506. While the shown example includes five planet gears 612, any suitable number of planet gears 612 is satisfactory.

The planetary gear 208 also includes a carrier 618 coupled to the at least one planet gear 612 through the planet pin 614 to promote alignment and uniform revolution of each planet gear 612. The carrier 618 can include a cage 620 and a cage cap 622. In some examples, the cage 620 includes an arm 624 extending longitudinally through a space between the at least one planet gear 612 and the ring gear 602 to secure the cage 620 to the cage cap 622. Each planet pin 614 can be attached to the cage 620 at a first end of the planet pin 614 and attached to the cage cap 622 at a second end of the planet pin 614.

Rotation of at least one of the sun gear 600 or the ring gear 602 will urge the at least one planet gear 612 to revolve about the central axis 506 in most circumstances. This revolution of the at least one planet gear 612 urges rotation of the carrier 618 about the central axis 506. The DPTO 200 includes the output shaft 210 which is attached or connected to the carrier 618 such that rotation of the carrier 618 urges rotation of the output shaft 210. The output shaft 210 is configured to transmit mechanical power as the output shaft rotational speed transferred from the planetary gear 208 of the DPTO 200.

Referring to FIGS. 5 and 6, as discussed previously, the input gear 406 is connected through a shaft 500 or another satisfactory structure to an idler gear 502. The idler gear 502 transfers rotational power to the driver gear 504 attached to the input shaft 206 of the DPTO 200. The input shaft 206 is attached to the ring gear 602 through the ring cap 606 or another suitable structure, such as a clutch. The described power transmission components transfer rotational power from the vehicle transmission 204 through the input gear 406 to the ring gear 602.

As discussed previously, the actuator 230 includes or is attached to the motor output shaft 412 (shown in FIG. 4). The motor output shaft urges rotation of the control shaft 514 through the intermediate control shaft 508, the first control gear 510, and the second control gear 512. The input shaft 206 can define an internal, axial passage 626 enabling the control shaft 514 to pass through the input shaft 206 along the central axis 506. One or more bearings 628 can be provided within the axial passage 626 enabling relative rotation of the control shaft 514 relative to the input shaft 206. After passing through the input shaft 206, the control shaft 514 is then attached to the sun gear 600. As such, the actuator 230 is mechanically coupled to a portion of the planetary gear 208 (e.g., the sun gear 600).

Generally, in known power take-off devices, the rotational speed input into the power take-off device can vary widely due to several factors including, but not limited to, the forward (or reverse) gear of the vehicle transmission at a particular time, the operator's call for acceleration to the engine from an idle condition to full acceleration, etc. Often, this relatively wide variation in rotational speed input to the power take-off device causes relatively wide variation in the output shaft rotational speed, particularly with fixed-gearing devices. Wide variation in the output shaft rotational speed can cause inefficient and/or unreliable operation of the service vehicle subsystems. With the described structures, the DPTO 200 employs a planetary gear 208 within a power take-off device 400 to modify the gear ratio of the planetary gear 208 by modifying the rotational speed of the sun gear 600 to maintain the desired output shaft rotational speed over a relatively wide range of input shaft rotational speeds.

In order to maintain the desired output shaft rotational speed over a range of input shaft rotational speeds, the actuator 230 can selectively urge rotation of the sun gear 600 such that, through the geometry and rotational speed of the planetary gear 208 components, the rotational speeds of the ring gear 602 and the sun gear 600 produce a planet gear 612 revolution speed equal to the desired output shaft rotational speed. The planet gear 612 revolution speed is then transferred through the carrier 618 to the output shaft 210, enabling the output shaft 210 to transmit mechanical power at the desired output shaft rotational speed. The actuator 230 can alter the rotational speed of the sun gear 600 as needed based upon an operating parameter received from the PTO controller 222 as the input shaft rotational speed varies over time.

As such, the DPTO 200 is configured to mechanically control the rotational speed of the sun gear 600 (and thus the output shaft rotational speed) as the actuator 230 continually receives an operating parameter in discrete time intervals from the controller circuitry 800. The operating parameter can be based solely on a difference between the output shaft rotational speed and the desired output shaft rotational speed.

In some examples, the actuator 230 can alter the rotational speed of the sun gear 600 to a rotational speed that yields an output shaft rotational speed of zero RPM. In other words, the geometry of the sun gear 600, the ring gear 602, and the at least one planet gear 612 in combination with the rotational speeds of the sun gear 600 and the ring gear 602 produce rotation of each planet gear 612 about the offset axes 616, but no revolution of the planet gears 612 about the central axis 506. As such, the carrier 618 has zero rotational speed about the central axis 506 necessitating a zero rotational speed (RPM) of the output shaft 210. In some examples, the output shaft rotational speed can be reduced to zero RPM using a clutch, a brake, or similar devices.

Figure 8:
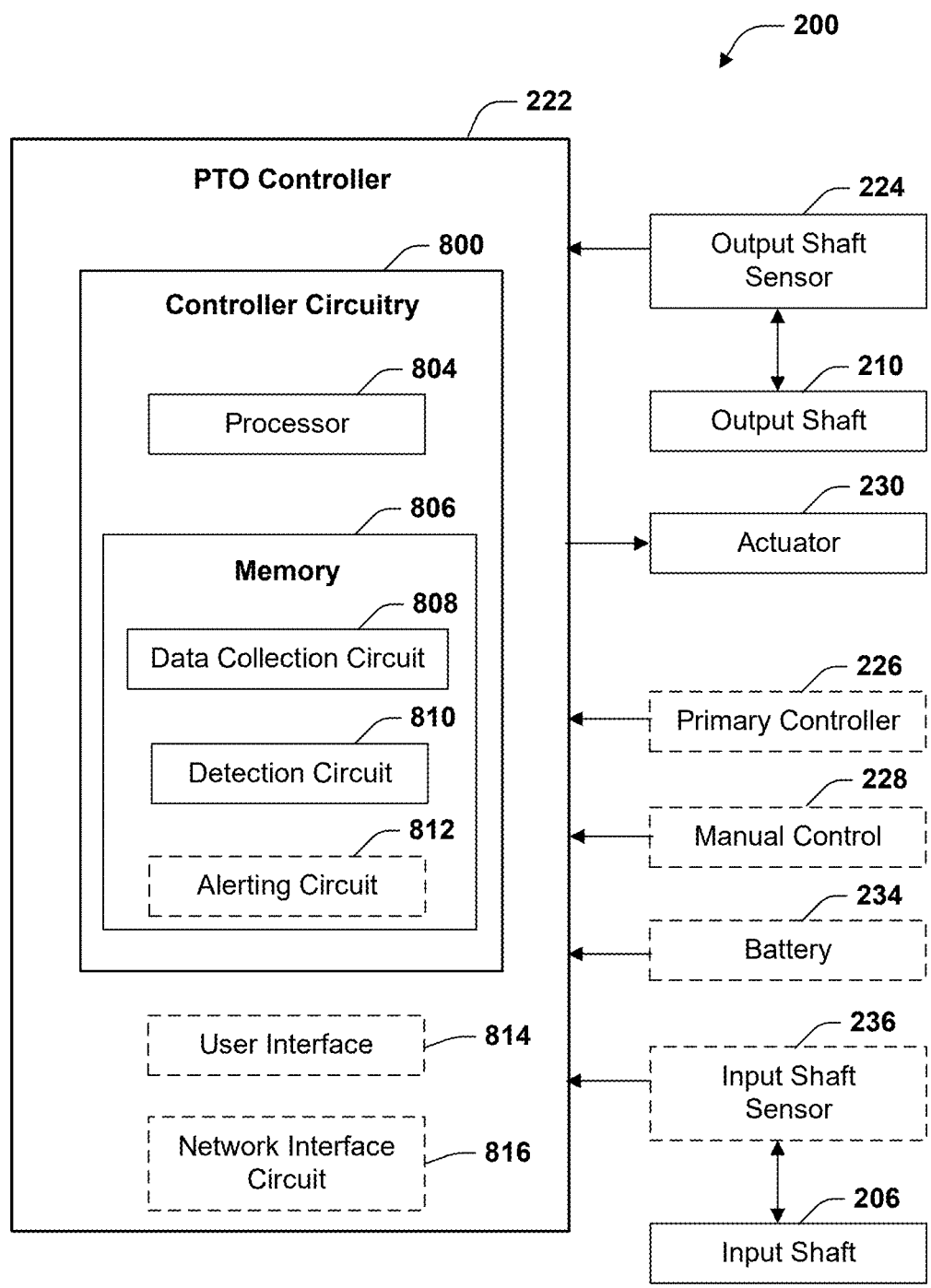
FIG. 8 is a schematic illustration of an exemplary controller circuitry of a PTO controller.

Referring to FIG. 8, an exemplary controller circuitry 800 of the PTO controller 222 within the DPTO 200 is schematically illustrated. The DPTO 200 and the controller circuitry 800 may be implemented and used by the service vehicle 100. The DPTO 200 includes a sensor 224 (the output shaft sensor 224) configured to detect the output shaft rotational speed. As described previously, the controller circuitry 800 is in electrical communication with the output shaft sensor 224 such that the data detected and or recorded by the output shaft sensor 224 is received by the controller circuitry 800 of the DPTO 200. The controller circuitry 800 is also in electrical communication with the actuator 230 such that the PTO controller 222 can output an operating parameter to the actuator 230 to control the actuator 230.

The controller circuitry 800 includes a processor 804 and a memory 806. The processor 804 is in electrical communication with the memory 806. The processor 804 can be a general purpose or specific purpose processor, a programmable logic controller (PLC), an application specific integrated circuit (ASIC), one or more field programmable gate arrays (FPGAs), a group of processing components, or other suitable processing components.

The processor 804 is configured to execute computer code or instructions stored in the memory 806 or received from other computer readable media (e.g., a CD-ROM, a network storage device, a remote server, etc.).

The memory 806 can include one or more devices (e.g., memory units, memory devices, storage devices, etc.) for storing data and/or computer code for completing and/or facilitating the various processes described in the present disclosure. The memory 806 may include random access memory (RAM), read-only memory (ROM), hard drive storage, temporary storage, non-volatile memory, flash memory, optical memory, or any other suitable memory for storing software objects and/or computer instructions. The memory 806 may be communicably connected to the processor 804 via the controller circuitry 800 and may include computer code for executing (e.g., by the processor 804) one or more of the processes described herein.

The memory 806 can include a data collection circuit 808 configured to collect and store data collected by the output shaft sensor 224. The data collection circuit 808 is configured to store data representing a preferred output shaft rotational speed. For example, the data collection circuit 808 can store a preferred output shaft rotational speed that equals or approaches a rotational speed that operates the hydraulic pump 218 within the POR. Additionally, the data collection circuit 808 is configured to store operating parameters that the PTO controller 222 provides to the actuator 230 to modify the gear ratio of the planetary gear 208. For example, the PTO controller 222 can output an operating parameter to the actuator 230 such that the PTO controller 222 controls the output shaft rotational speed.

In some examples, though not necessary, the data collection circuit 808 can be configured to store threshold measurements for the output shaft sensor 224. In certain embodiments, the threshold measurement may represent both an upper threshold measurement (i.e., the upper bound) and a lower threshold measurement (i.e., a lower bound), such that a measurement of the output shaft sensor 224 below the lower bound or above the upper bound may be indicative of a critical event requiring an alert or notification.

The memory 806 can include a detection circuit 810 that can be configured to receive a signal from the output shaft sensor 224 and compare this data to the preferred output shaft rotational speed data stored by the data collection circuit 808. For example, the detection circuit 810 is configured to determine if an output shaft rotational speed reading from the output shaft sensor 224 differs from the preferred output shaft rotational speed stored in the data collection circuit 808. For example, the detection circuit 810 may determine whether the output shaft rotational speed is less than or greater than the preferred output shaft rotational speed.

As described, the PTO controller 222 can be a PLC controller having a single input and a single output. The single input can include a signal representing the output shaft rotational speed from the output shaft sensor 224 and the single output can include the operational parameter that is output to the actuator 230.

Optionally, the controller circuitry 800 of the PTO controller 222 can be in electrical communication with an input shaft sensor 236 configured to detect the rotational speed of the input shaft 206. The input shaft sensor 236 can be any suitable type of sensor capable of accurately measuring rotational speed, such as a magnetic pickup sensor, an optical encoder, or a Hall-effect sensor. By monitoring the input shaft rotational speed, the DPTO 200 gains additional data that enhances the control and responsiveness of the system.

In some examples of the DPTO 200, the detection circuit 810 collects and stores data from both the input shaft sensor 236 and the output shaft sensor 224. Utilizing data from both sensors, the processor 804 can determine, based upon a stored algorithm, an appropriate operating parameter to output to the actuator 230. This may enable the system to maintain the desired output shaft rotational speed more effectively.

With input from both sensors, the processor 804 can employ feedforward control strategies that use input shaft speed data to predict necessary adjustments, in addition to feedback control based on the difference between actual and desired output shaft speeds. By considering the ratio of input to output shaft speeds, the processor 804 can determine the most efficient operating parameter, improving the overall efficiency of the DPTO system. This efficiency reduces energy losses and minimizes wear on mechanical components.

Monitoring the input shaft rotational speed also allows the system to detect abnormal operating conditions, such as excessive engine speeds or sudden drops in input power. In such cases, the controller circuitry 800 can initiate protective actions, such as reducing the output shaft speed or alerting the operator, to prevent damage to the DPTO system or connected subsystems. This enhances the safety and reliability of the entire system.

The processor 804 may use the input shaft rotational speed data in conjunction with the output shaft speed to calculate the required rotational speed adjustment for the sun gear 600. For instance, if the input shaft speed increases due to engine acceleration, the processor 804 can adjust the operating parameter sent to the actuator 230 to modify the sun gear's rotational speed appropriately. This adjustment compensates for the change in input speed, maintaining the output shaft rotational speed at the desired level.

Furthermore, the input shaft sensor 236 can be used for diagnostic purposes. By comparing input and output shaft speeds over time, the system can detect inefficiencies or mechanical issues within the planetary gear 208 or other components. This data can be logged and analyzed to schedule maintenance or address potential problems before they lead to system failure, thereby enhancing the longevity and reliability of the system.

The stored algorithm within the processor 804 may include proportional-integral-derivative (PID) control logic or other advanced control strategies that utilize both input and output shaft speeds to determine the optimal operating parameter for the actuator 230. For example, when the service vehicle 100 is climbing a hill or carrying a heavy load, the engine 114 might operate at higher RPMs. The input shaft sensor 236 detects this increase, and the processor 804 adjusts the sun gear 600's speed to prevent the output shaft 210 from exceeding the desired rotational speed. This protects the hydraulic pump 218 and other subsystems from damage due to over-speed conditions.

While not required, the controller circuitry 800 of the PTO controller 222 can be in electrical communication with additional features such as the primary controller 226 and the manual control 228 as described previously. The controller circuitry 800 can also be in electrical communication with a secondary battery 234. The secondary battery 234 can enable the PTO controller 222 to operate independently of a main vehicle battery often associated with vehicles including internal combustion engines.

Additional optional features of the controller circuitry 800 can include an alerting circuit 812 configured to perform one or more operations in response to receiving an indication of a critical event or a critical operating condition. In some examples, the alerting circuit 812 can signal a user interface 814 to provide notification of the event or condition to the operator of the service vehicle 100. Another optional component of the controller circuitry 800 can include a network interface circuit 816 configured to enable the PTO controller 222 to exchange information over a network. The network interface circuit 816 can include programming logic that facilitates connection of the PTO controller 222 to an available network.

Figure 9:
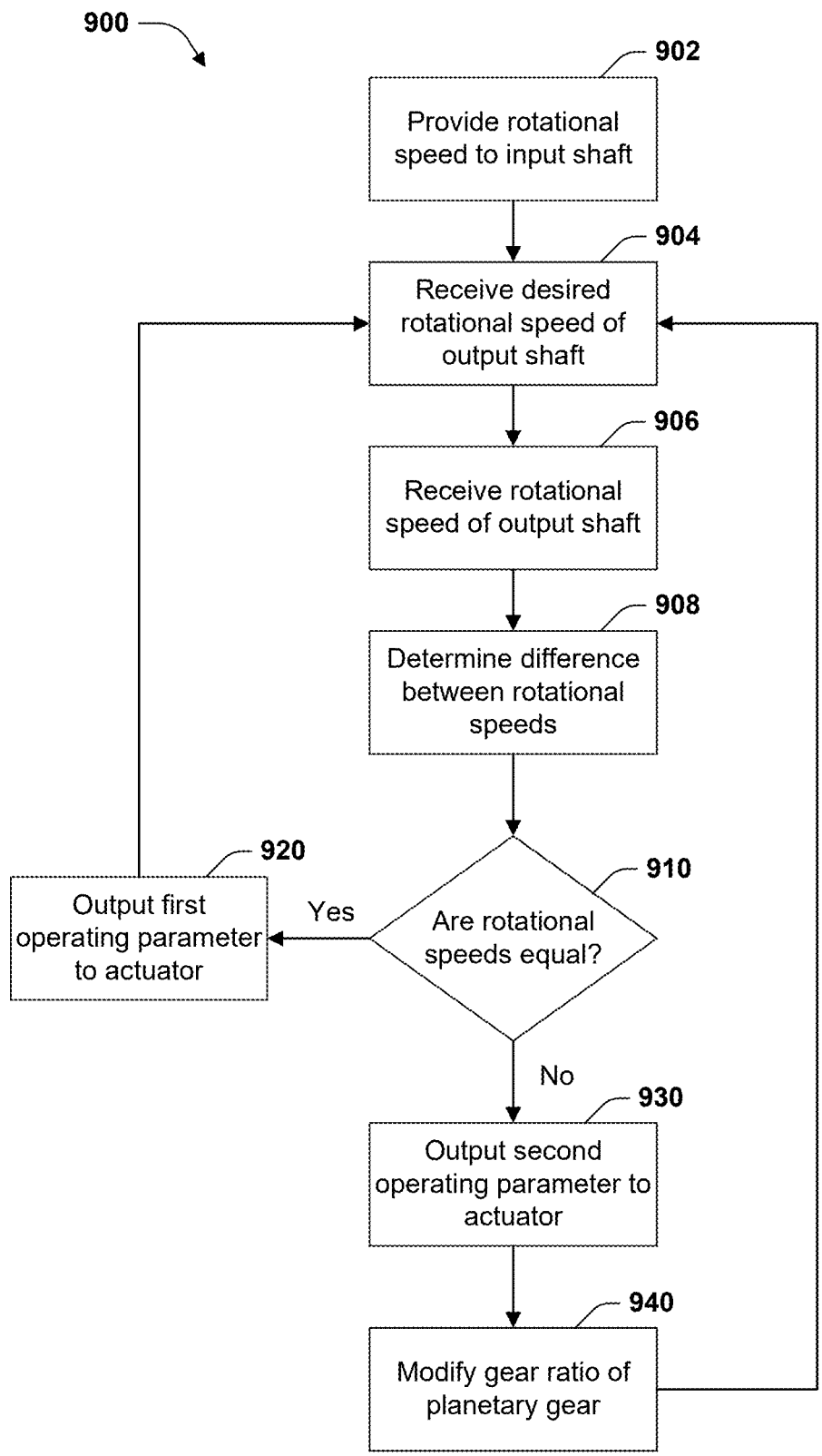
FIG. 9 is a flow diagram of an exemplary digital PTO control process.

Referring to FIG. 9, a flow diagram of an exemplary DPTO 200 control process 900 is illustrated. For example, the control process 900 may be performed by the PTO controller 222. The process 900 begins with process 902, providing a rotational speed to an input shaft 206 of a power take-off device 400. Often, process 902 will include operating the engine 114, which may be an internal combustion engine. For example, an operator starts the engine 114 of the service vehicle 100 to accomplish required tasks of service vehicle 100, such as driving to various locations of refuse containers to collect refuse. The engine 114 can provide mechanical power in the form of rotational speed of the power transmission components of the service vehicle 100 such as the input shaft 206. The power take-off device 400 can be attached to the transmission components of the service vehicle to power various vehicle subsystems 212, 214, 216 from the existing power source (e.g., the engine 114). The power take-off device 400 can be included in the DPTO 200.

The controller circuitry 800 of the PTO controller 222 receives the desired output shaft rotational speed as a part of process 904, which may occur before or after process 902. The controller circuitry 800 can receive the desired output shaft rotational speed by any suitable methods and structures. For example, the desired output shaft rotational speed can be: data stored in the data collection circuit 808; a value manually input via an operator using the manual control 228; a value input from the primary controller 230; a value read from the hydraulic pump; etc. In some examples, the desired output shaft rotational speed may be predetermined based on modeling, testing, and/or prior performance of the vehicle subsystem 212, 214, 216.

After the controller circuitry 800 of the PTO controller 222 receives the desired output shaft rotational speed, the PTO controller 222 receives the output shaft rotational speed from the output shaft sensor 224 at process 906. For example, the output shaft sensor 224 detects or reads the actual output shaft rotational speed and outputs a signal to the controller circuitry 800 representing the output shaft rotational speed.

When the controller circuitry 800 has received the output shaft rotational speed, the detection circuit 310 may then compare the data from the output shaft sensor 224 to the desired output shaft rotational speed stored in the data collection circuit 808 as a part of process 908. The detection circuit 310 can determine a difference between the output shaft rotational speed and the desired output shaft rotational speed. As discussed previously, the desired output shaft rotational speed can be a single value or a range of values that tends to keep the hydraulic pump 218 operating within the POR.

If the detection circuit 810 determines there is no difference between the output shaft rotational speed and the desired output shaft rotational speed, the controller circuitry 800 can output a first operating parameter to the actuator 230 at process 920 as a result of the decision process 910. The actuator 230 is configured to receive the first operating parameter to maintain the rotational speed and rotational direction of the motor output shaft 412. Maintaining the rotational speed and rotational direction of the motor output shaft 412 continues to rotate the sun gear 600 at the same rotational speed to maintain the gear ratio of the planetary gear 208. As such, the output shaft rotational speed continues to match (or relatively closely match) the desired output shaft rotational speed.

If the detection circuit 810 determines there is a difference between the output shaft rotational speed and the desired output shaft rotational speed, the PTO controller 222 can output a second operating parameter to the actuator 230 at process 930 as a result of the decision process 910. The actuator 230 is configured to receive the second operating parameter causing the actuator 230 to modify the rotational speed of the motor output shaft 412 as a part of the process 940. Modifying the rotational speed of the motor output shaft 412 modifies the rotational speed of the sun gear 600 to modify the gear ratio of the planetary gear 208. As such, the output shaft rotational speed increases or decreases (as appropriate) toward the desired output shaft rotational speed thereby making the power take-off system a digital power take-off system, or a DPTO 200.

Regardless of the result at the decision process 910, the path of the process 900 returns to the process 904 to receive the desired output shaft rotational speed. In some examples, the desired output shaft rotational speed will not have changed from the previous process cycle. In some examples, the desired output shaft rotational speed will have changed through one of the previously described methods through which the controller circuitry 800 receives the desired output shaft rotational speed.

The process 900 return paths from the processes 910 and 930 to the process 904 can form a closed loop feedback process. In some examples, the closed loop feedback process to control the output shaft rotational speed does not require detection of other system characteristics such as the rotational speed of the sun gear 600, the rotational speed of the input shaft 206, the hydraulic pressure generated at the hydraulic pump 218, etc. In some examples, the sole input to the controller circuitry 800 is the actual output shaft rotational speed (e.g., actual output RPM) as detected by the output shaft sensor 224.

The controller circuitry of the PTO controller 222 (e.g., a PLC) compares the desired output shaft rotational speed (e.g., desired output RPM) to the actual output RPM. Based upon the comparison, the controller circuitry outputs an operating parameter to the actuator 230 to control the speed of the sun gear 600 to maintain or modify the actual output RPM at or toward the desired output RPM. The described process can also modify the actual output RPM to zero RPM if so desired.

The controller circuitry 800 may use any suitable algorithm or logic to determine the appropriate operating parameter to output to the actuator 230. For example, the controller circuitry 800 could implement a proportional control strategy. In proportional control, the operating parameter is adjusted in direct proportion to the error between the desired output shaft rotational speed and the actual output shaft rotational speed. The controller calculates this error and applies a correction factor proportional to the magnitude of the error, allowing for straightforward implementation and adequate performance in systems with relatively constant dynamics.

Alternatively, the controller circuitry 800 may employ a proportional-integral-derivative (PID) control algorithm that considers not only the current error but also the accumulation of past errors and the prediction of future errors. The PID control algorithm continuously calculates an error value as the difference between the desired output and the measured output. It then computes the control signal (operating parameter) by combining three components: the proportional term (P), which produces an output proportional to the current error; the integral term (I), which accounts for the accumulation of past errors by integrating the error over time and helps eliminate residual steady-state errors; and the derivative term (D), which predicts future errors by considering the rate of change of the error, improving the system's stability and response by dampening oscillations and reducing overshoot.

By tuning the gains associated with each term—the proportional gain, integral gain, and derivative gain—the controller can be optimized to achieve the desired system performance, balancing responsiveness and stability. Implementing a PID controller allows the DPTO system to maintain the desired output shaft rotational speed more precisely, even in the face of disturbances or varying load conditions.

Other relevant control strategies may also be utilized by the controller circuitry 800. For instance, adaptive control algorithms can adjust control parameters in real-time based on changes in system dynamics or operating conditions. This approach is particularly useful in systems where parameters may vary significantly over time or under different loads. Feedforward control can be incorporated to anticipate disturbances or changes in the input shaft rotational speed by using a mathematical model of the system. By predicting the necessary adjustments in advance, feedforward control enhances the system's ability to maintain the desired output shaft rotational speed with minimal delay.

Moreover, the controller circuitry 800 may implement model predictive control (MPC), which uses an internal model of the system to predict future behavior over a specified time horizon. MPC optimizes the control inputs by solving an optimization problem at each control interval, considering both current and future system states while respecting constraints. This method can handle multi-variable control problems and accommodate system constraints more effectively than traditional control strategies.

The choice of control algorithm depends on various factors, including the complexity of the DPTO system, the computational resources available, and the specific performance requirements of the vehicle subsystems powered by the DPTO 200. Implementing advanced control strategies like PID control or MPC can enhance the performance of the DPTO system by providing faster response times, reducing steady-state errors, and improving robustness against disturbances and parameter variations.

By utilizing suitable algorithms and control logic, the controller circuitry 800 ensures that the actuator 230 adjusts the rotational speed of the sun gear 600 appropriately to maintain the desired output shaft rotational speed. This precise control may improve operation of connected subsystems, such as hydraulic pumps, which require consistent rotational speeds for efficient performance. Consequently, the DPTO system may enhance the overall efficiency, reliability, and safety of the service vehicle's operations, contributing to reduced fuel consumption, lower maintenance costs, and improved longevity of mechanical components.

The presently disclosed structures and methods of operating a DPTO can provide several benefits. For example, the DPTO can help provide a constant or relatively constant output shaft rotational speed (e.g., constant actual output RPM) despite RPM changes of the service vehicle engine typically experienced during regular operation of the service vehicle.

The described system and processes can generate significant fuel savings. The operator can selectively modify the actual output RPM to zero when the vehicle subsystems are not in operation. As such, the service vehicle is not expending fuel to provide power to the hydraulic pump of the vehicle subsystems when the subsystems are not in use. In other words, the hydraulic pump can be operated solely "on demand" to prevent wasteful production of hydraulic pressure when not required.

The disclosed structures and methods can provide a relatively simple solution for control of actual output shaft rotational speed from a power take-off device. The DPTO can also reduce maintenance frequency and expenses for vehicle subsystem hydraulic pumps that benefit from significantly reduced operating time and reduced operating stress resulting from abrupt transmission gear changes.

The disclosed DPTO can eliminate potential problems arising when different hydraulic pumps are added to the vehicle subsystems in an effort to remedy the variable rotational speed issue. For example, the DPTO can eliminate a wasted power issue when using hydraulic pumps that produce greater flow volume at higher pressure than typical vehicle subsystem hydraulic pumps. These replacement hydraulic pumps often produce unnecessarily high flow volume of hydraulic fluid at higher operating RPM which requires the hydraulic system to dump pressurized hydraulic fluid to a system reservoir, thus wasting power. In another example, the DPTO can eliminate hydraulic pump reliability issues when replacing typical vehicle subsystem hydraulic pumps with pressure compensating piston pumps. Often, the piston pumps can be relatively sensitive to contamination which is often incompatible with service vehicle use.

The disclosed DPTO can also alleviate the need for clutches in the power take-off device to allow an operator to disconnect the input of the power take-off from the output of the power take-off at relatively high RPM operation. The clutch enables the operator to remove the mechanical power application to the hydraulic pump, thus avoiding excess hydraulic fluid flow at relatively high RPM engine operation.

Although the apparatus and methods have been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

The invention claimed is:

1. A digital power take-off system, comprising:
an input shaft configured to receive mechanical power as an input shaft rotational speed;
an output shaft configured to transmit mechanical power as an output shaft rotational speed;
a planetary gear comprising:
a sun gear located along a central axis;
a ring gear located around the sun gear and sharing the central axis with the sun gear, the ring gear removably connected to the input shaft;
at least one planet gear located between and engaged with the sun gear and the ring gear for rotation about an offset axis and revolution about the central axis; and
a carrier coupled to the at least one planet gear such that revolution of the at least one planet gear urges rotation of the carrier, the carrier removably connected to the output shaft;
an actuator mechanically coupled to the sun gear and configured to mechanically control a rotational speed of the sun gear based on a received operating parameter;
an output shaft sensor configured to detect the output shaft rotational speed; and
a controller circuitry in electrical communication with the output shaft sensor and the actuator, and configured to:
receive a desired output shaft rotational speed;
receive the output shaft rotational speed from the output shaft sensor;
determine a difference between the output shaft rotational speed and the desired output shaft rotational speed;
determine the operating parameter based on the determined difference; and
output the operating parameter to the actuator, such that the actuator modifies a gear ratio of the planetary gear by modifying the rotational speed of the sun gear to maintain the desired output shaft rotational speed over a range of input shaft rotational speeds.

2. The digital power take-off system of claim 1, wherein the desired output shaft rotational speed describes a preferred range of output shaft rotational speeds.

3. The digital power take-off system of claim 1, wherein: the controller circuitry is a programmable logic controller having:
a single input comprising the output shaft rotational speed from the output shaft sensor; and
a single output comprising the operating parameter.

4. The digital power take-off system of claim 1, further comprising a manual control device in electrical communication with the controller circuitry, wherein the manual control device is configured to selectively send an electrical signal to the controller circuitry to modify the desired output shaft rotational speed.

5. The digital power take-off system of claim 1, further comprising a primary controller including processor circuitry in electrical communication with the controller circuitry, wherein the primary controller is configured to send an electrical signal to the controller circuitry to modify the desired output shaft rotational speed.

6. The digital power take-off system of claim 1, further comprising an input shaft sensor configured to detect the input shaft rotational speed, the input shaft sensor in electrical communication with at least one of the controller circuitry or a primary controller.

7. The digital power take-off system of claim 6, wherein the primary controller is further configured to:
receive from the input shaft sensor, the input shaft rotational speed;
modify the desired output shaft rotational speed based on the received input shaft rotational speed data.

8. The digital power take-off system of claim 6, wherein the controller circuitry is further configured to determine the operating parameter based on the determined difference and the input shaft rotational speed.

9. A method comprising:
providing power to one or more components of a subsystem of a service vehicle, the service vehicle comprising:
a chassis supporting a wheel;
an engine configured to provide mechanical power to drive the wheel; and
a digital power take-off system attached to the chassis, the digital power take-off system comprising:
an input shaft configured to receive mechanical power as an input shaft rotational speed;
an output shaft configured to transmit mechanical power as an output shaft rotational speed;
a planetary gear comprising:
a sun gear located along a central axis;
a ring gear located around the sun gear and sharing the central axis with the sun gear, the ring gear removably connected to the input shaft;
at least one planet gear located between and engaged with the sun gear and the ring gear for rotation about an offset axis and revolution about the central axis; and
a carrier coupled to the at least one planet gear such that revolution of the at least one planet gear urges rotation of the carrier, the carrier removably connected to the output shaft;
an actuator mechanically coupled to the sun gear and configured to mechanically control a rotational speed of the sun gear based on a received operating parameter;
an output shaft sensor configured to detect the output shaft rotational speed;
a controller circuitry in electrical communication with the output shaft sensor and the actuator, and configured to:
receive a desired output shaft rotational speed,
receive the output shaft rotational speed from the output shaft sensor,
determine a difference between the output shaft rotational speed and the desired output shaft rotational speed,
determine the operating parameter based on the determined difference, and
output the operating parameter to the actuator such that the actuator modifies a gear ratio of the planetary gear by modifying the rotational speed of the sun gear to maintain the desired output shaft rotational speed over a range of input shaft rotational speeds.

10. The method of claim 9, wherein the engine is an internal combustion engine having a mechanical rotational output transferred to a transmission having a plurality of gearing configurations to provide a plurality of forward driving gears.

11. The method of claim 9, wherein the one or more components of a subsystem of the service vehicle comprises a hydraulic pump, and the desired output shaft rotational speed is within a preferred range of shaft rotational speeds to operate the hydraulic pump.

12. The method of claim 9, wherein the controller circuitry is further configured to selectively reduce the output shaft rotational speed to zero revolutions per minute.

13. The method of claim 9, wherein providing power to the one or more components of the subsystem of the service vehicle includes providing power to to the one or more components of the subsystem of the service vehicle selectively on demand.

14. The method of claim 9, wherein the controller circuitry is further configured to output an electrical signal warning indication in response to the output shaft rotational speed being less than a critical operation minimum rotational speed.

15. The method of claim 9, wherein the operating parameter informs the actuator to rotate the sun gear at least one of slower or faster to modify the output shaft rotational speed to match the desired output shaft rotational speed.

16. The method of claim 9, wherein the operating parameter informs the actuator to rotate the sun gear at least one of slower or faster to modify the output shaft rotational speed to be within a range of rotational speeds defined by the desired output shaft rotational speed.

17. A service vehicle comprising:
a chassis supporting a wheel;
an engine configured to provide mechanical power to drive the wheel;
a digital power take-off system attached to the chassis, the digital power take-off system comprising:
an input shaft configured to receive mechanical power as an input shaft rotational speed;
an output shaft configured to transmit mechanical power as an output shaft rotational speed;
a planetary gear comprising:
a sun gear located along a central axis;
a ring gear located around the sun gear and sharing the central axis with the sun gear, the ring gear removably connected to the input shaft;
at least one planet gear located between and engaged with the sun gear and the ring gear for rotation about an offset axis and revolution about the central axis; and
a carrier coupled to the at least one planet gear such that revolution of the at least one planet gear urges rotation of the carrier, the carrier removably connected to the output shaft;
an actuator mechanically coupled to the sun gear and configured to mechanically control a rotational speed of the sun gear based on a received operating parameter;
an output shaft sensor configured to detect the output shaft rotational speed; and
a controller circuitry in electrical communication with the output shaft sensor and the actuator, and configured to:
receive a desired output shaft rotational speed;
receive the output shaft rotational speed from the output shaft sensor;
determine a difference between the output shaft rotational speed and the desired output shaft rotational speed;
determine the operating parameter based on the determined difference; and
output the operating parameter to the actuator, such that the actuator modifies a gear ratio of the planetary gear by modifying the rotational speed of the sun gear to maintain the desired output shaft rotational speed over a range of input shaft rotational speeds.

18. The service vehicle of claim 17, wherein the service vehicle is a refuse truck.

19. The service vehicle of claim 18, further comprising a compactor system to compact a quantity of refuse within an enclosed portion of the service vehicle, the compactor system is connected to and receives power from the digital power take-off system.

20. The service vehicle of claim 18, further comprising a lifting system to lift a refuse container and tip the refuse container, the lifting system is connected to and receives power from the digital power take-off system.

* * * * *